(12) United States Patent
Wang et al.

(10) Patent No.: US 11,418,734 B1
(45) Date of Patent: Aug. 16, 2022

(54) DUAL CONVERSION GAIN IMAGE SENSOR

(71) Applicant: OMNIVISION TECHNOLOGIES (SHANGHAI) CO., LTD., Shanghai (CN)

(72) Inventors: Yunyi Wang, Shanghai (CN); Zejian Wang, Santa Clara, CA (US); Yusheng Yang, San Jose, CA (US)

(73) Assignee: OMNIVISION TECHNOLOGIES (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 17/408,926

(22) Filed: Aug. 23, 2021

(30) Foreign Application Priority Data

Mar. 22, 2021 (CN) .......................... 202110302128.3

(51) Int. Cl.
| | |
|---|---|
| *H04N 5/355* | (2011.01) |
| *H04N 5/378* | (2011.01) |
| *H04N 5/357* | (2011.01) |
| *H04N 5/343* | (2011.01) |
| *H04N 5/369* | (2011.01) |
| *H04N 5/363* | (2011.01) |

(52) U.S. Cl.
CPC ........... *H04N 5/3559* (2013.01); *H04N 5/343* (2013.01); *H04N 5/357* (2013.01); *H04N 5/363* (2013.01); *H04N 5/3698* (2013.01); *H04N 5/378* (2013.01)

(58) Field of Classification Search
CPC ...... H04N 5/343; H04N 5/3559; H04N 5/357; H04N 5/363; H04N 5/3698; H04N 5/378
See application file for complete search history.

(56) References Cited

U.S. PATENT DOCUMENTS

| | | | |
|---|---|---|---|
| 10,356,351 B1* | 7/2019 | Ebihara | ................ H04N 5/2355 |
| 2018/0302578 A1* | 10/2018 | Ebihara | ............. H04N 5/37452 |
| 2020/0068147 A1* | 2/2020 | Hayashi | .................... G06T 7/55 |

* cited by examiner

*Primary Examiner* — Daniel M Pasiewicz
(74) *Attorney, Agent, or Firm* — Womble Bond Dickinson (US) LLP

(57) ABSTRACT

The present invention provides a dual conversion gain image sensor comprising: a pixel circuit, through which pixel power supply voltage noise is transferred to a bit line; a power supply noise cancellation circuit with an input to which the pixel power supply voltage is applied, the power supply noise cancellation circuit mimicly producing a first transfer function with the aid of a low conversion gain path, the power supply noise cancellation circuit mimicly producing a second transfer function with the aid of a high conversion gain path; and a comparator. According to the present invention, the low and high conversion gain paths are two independent power supply noise cancellation paths that result in different transfer functions capable of tracking the variation of the pixel power supply voltage in low and high conversion gain modes.

14 Claims, 6 Drawing Sheets

DUAL CONVERSION GAIN IMAGE SENSOR

CROSS-REFERENCE TO RELATED APPLICATION

This application claims the priority of Chinese patent application number 202110302128.3, filed on Mar. 22, 2021, the entire contents of which are incorporated herein by reference.

TECHNICAL FIELD

The present invention pertains to the field of image sensors technology, in particular, relates to a dual conversion gain (DCG) image sensor.

BACKGROUND

Image sensors are widely used in digital still cameras, cellular phones, security cameras, as well as medical, automotive and many other applications.

Dual conversion gain (DCG) image sensors can operate in a DCG mode to provide high dynamic range images by combining both readouts from pixels respectively at low (LCG) and high (HCG) conversion gains. The LCG and HCG outputs can be used under bright- and low-light conditions, respectively, together providing a high dynamic range.

A DCG image sensor may suffer from the problem of affected image quality due to interfering pixel power supply noise. Such noise may affect signal quantization and image quality in the following ways: the power supply is "unclean" and may become a source of noise variations within a certain frequency range; depending on the arrangement of pixels, parasitic capacitance may result; a parasitic path may lead to presence of the noise in a bit line; and the noise will be quantized downstream of a comparator, which is detrimental to image quality.

SUMMARY OF THE INVENTION

It is an object of the present invention to provide a dual conversion gain (DCG) image sensor with image quality less affected by pixel power supply noise.

The present invention provides a dual conversion gain image sensor, comprising:

a pixel circuit through which a noise of a pixel power supply voltage is transferred to a bit line, wherein the pixel circuit comprises a low conversion gain mode and a high conversion gain mode;

a power supply noise cancellation circuit having an input to which the pixel power supply voltage is applied, the power supply noise cancellation circuit mimicly producing, with the aid of a low conversion gain path, a first transfer function that approximates a low conversion gain mode transfer function of the pixel circuit from the pixel power supply voltage to a bit line voltage, the power supply noise cancellation circuit mimicly producing, with the aid of a high conversion gain path, a second transfer function that approximates a high conversion gain mode transfer function of the pixel circuit from the pixel power supply voltage to the bit line voltage, each of the first and second transfer functions being input-to-output transfer functions of the power supply noise cancellation circuit, wherein the power supply noise cancellation circuit is configured to produce a ramp voltage signal; and a comparator having a first input coupled to the bit line and second input coupled to an output of the power supply noise cancellation circuit.

Additionally, the power supply noise cancellation circuit may comprise a filtering operational amplifier and an integrating operational amplifier, wherein the integrating operational amplifier comprises a first non-inverting input, a second non-inverting input and an inverting input and an output, wherein the first non-inverting input is coupled to an output of the filtering operational amplifier via the high conversion gain path, and wherein the second non-inverting input is coupled to the output of the filtering operational amplifier via the low conversion gain path.

Additionally, the pixel power supply voltage may be provided to a non-inverting input of the filtering operational amplifier, wherein a variable resistor and a variable capacitor are coupled in parallel between an inverting input and the output of the filtering operational amplifier.

Additionally, an integrating capacitor and an integration enable switch may be coupled in parallel between the inverting input and the output of the integrating operational amplifier, wherein an internal circuit of the integrating operational amplifier comprises a low gain select switch and a high gain select switch.

Additionally, the output of the filtering operational amplifier may be grounded via a first capacitor and a second capacitor, wherein a node between the first and second capacitors is coupled to a first end of the high path switch and a second end of the high path switch is coupled to the first non-inverting input.

Additionally, the output of the filtering operational amplifier may be grounded via a third capacitor and a fourth capacitor, wherein a node between the third and fourth capacitors is coupled to one end of the low path switch and the other end of low path switch is coupled to the second non-inverting input.

Additionally, the internal circuit of the integrating operational amplifier may further comprise first to sixth transistors, wherein in a path of the inverting input, a first terminal of the fifth transistor is coupled to a second terminal of the sixth transistor and a bias voltage is applied to a gate of the sixth transistor, wherein in a path of the first non-inverting input, a first terminal of the second transistor is coupled to a second terminal of the fourth transistor, and wherein a high conversion gain bias voltage is applied to a gate of the fourth transistor, and wherein in a path of the second non-inverting input, a first terminal of the first transistor is coupled to a second terminal of the third transistor, wherein a low conversion gain bias voltage is applied to a gate of the third transistor, and wherein a first terminal of the third transistor and a first terminal of the fourth transistor are coupled to a common node.

Additionally, a voltage present at the second non-inverting input may be provided to a gate of the first transistor, wherein a voltage present at the first non-inverting input is provided to a gate of the second transistor, wherein a voltage present at the inverting input is provided to a gate of the fifth transistor, and wherein a second terminal of each of the first, second and the fifth transistors is grounded via a tail current source.

Additionally, the internal circuit of the integrating operational amplifier may further comprise a seventh transistor and an eighth transistor, wherein: the seventh transistor has a first terminal coupled to the gate of the fourth transistor;

the seventh transistor has a gate applied with a voltage serving as a control signal for the high gain select switch; the seventh transistor has a second terminal coupled to a first terminal of the eighth transistor; and the eighth transistor has a second terminal grounded; and the eighth transistor has a gate applied with a voltage serving as a control signal for the low gain select switch, wherein a node between the second terminal of the seventh transistor and the first terminal of the eighth transistor is coupled to the gate of the sixth transistor, wherein the high conversion gain bias voltage is equal to the bias voltage when the high gain select switch is closed with the low gain select switch being open, and wherein the high conversion bias voltage is equal to zero when the high gain select switch is open while the low gain select switch is closed.

Additionally, the internal circuit of the integrating operational amplifier may further comprise a ninth transistor and a tenth transistor, wherein: the ninth transistor has a first terminal coupled to the gate of the third transistor; the ninth transistor has a gate applied with a voltage serving as a control signal for the low gain select switch; the ninth transistor has a second terminal coupled to a first terminal of the tenth transistor; the tenth transistor has a second terminal grounded; and the tenth transistor has a gate applied with a voltage serving as a control signal for the high gain select switch, wherein a node between the second terminal of the ninth transistor and the first terminal of the tenth transistor is coupled to the gate of the sixth transistor, wherein the low conversion gain bias voltage is equal to the bias voltage when the low gain select switch is closed with the high gain select switch being open, and wherein the low conversion gain bias voltage is equal to zero when the low gain select switch is open while the high gain select switch is closed.

Additionally, the pixel circuit may comprise a dual conversion gain transistor having a gate controlled by a conversion gain signal, wherein the pixel circuit is configured to sequentially read a low conversion gain reset signal, a high conversion gain reset signal, a high conversion gain image signal and a low conversion gain image signal.

Additionally, in a first time interval during the reading of the low conversion gain reset signal, the integration enable switch is open to allow the integrating operational amplifier to perform an integration operation and the conversion gain signal is high to cause the pixel circuit to operate in the low conversion gain mode with the low gain select switch being closed, and in a fourth time interval during the reading of the low conversion gain image signal, the integration enable switch is open to allow the integrating operational amplifier to perform an integration operation and the conversion gain signal is high to cause the pixel circuit to operate in the low conversion gain mode with the low gain select switch being closed, the power supply noise cancellation circuit may mimic a variation of the pixel power supply voltage of the pixel circuit in the low conversion gain mode.

Additionally, in a second time interval during the reading of the high conversion gain reset signal, the integration enable switch is open to allow the integrating operational amplifier to perform an integration operation and the conversion gain signal is low to cause the pixel circuit to operate in the high conversion gain mode with the high gain select switch being closed, and in a third time interval during the reading of the high conversion gain image signal, the integration enable switch is open to allow the integrating operational amplifier to perform an integration operation and the conversion gain signal is low to cause the pixel circuit to operate in the high conversion gain mode with the high gain select switch being closed, the power supply noise cancellation circuit may mimic a variation of the pixel power supply voltage of the pixel circuit in the high conversion gain mode.

Additionally, the bit line may be coupled to an inverting input of the comparator by a first sampling capacitor, and the output of the power supply noise cancellation circuit may be coupled to a non-inverting input of the comparator by a second sampling capacitor.

Compared with the prior art, the present invention provides the beneficial effects as follows:

It provides a dual conversion gain image sensor comprising: a pixel circuit, through which a noise pixel power supply voltage is transferred to a bit line; a power supply noise cancellation circuit with an input to which the pixel power supply voltage is applied, the power supply noise cancellation circuit mimicly producing a first transfer function with the aid of a low conversion gain path, the power supply noise cancellation circuit mimicly producing a second transfer function with the aid of a high conversion gain path; and a comparator. According to the present invention, the low and high conversion gain paths are two independent power supply noise cancellation paths that result in different transfer functions capable of tracking the variation of the pixel power supply voltage in low and high conversion gain modes. This allows mitigating the effects of power supply noise in those modes. Decoupling noise cancellation mechanism for the low and high conversion gain modes reduces adverse impact of power supply noise and improves image quality.

In these figures,

A: a pixel circuit; B: a power supply noise cancellation circuit; 10: a filtering op-amp; 20: an integrating op-amp; 201: a tail current source; 202: an active load; and 30: a comparator.

DETAILED DESCRIPTION

In view of the above, embodiments disclosed herein provide a dual conversion gain (DCG) image sensor. The present invention will be described in greater detail below by way of specific examples with reference to the accompanying drawings. Features and advantages of the invention will be more apparent from the following description. Note that the accompanying drawings are provided in a very simplified form not necessarily drawn to exact scale for the only purpose of helping to explain the disclosed embodiments in a more convenient and clearer way.

A dual conversion gain (DCG) image sensor according to embodiments of the present invention comprises:

a pixel circuit, through which noise of a pixel power supply voltage is transferred to a bit line, the pixel circuit comprising a low conversion gain (LCG) mode and high conversion gain (HCG) mode;

a power supply noise cancellation (PSNC) circuit with an input to which the pixel power supply voltage is applied, the PSNC circuit mimicly producing, with the aid of an LCG path, a first transfer function that approximates (i.e., is similar to) a LCG-mode transfer function of the pixel circuit from the pixel power supply voltage to a bit line voltage, the PSNC circuit mimicly producing, with the aid of an HCG path, a second transfer function that approximates (i.e., is similar to) a HCG-mode transfer function of the pixel circuit from the pixel power supply voltage to the bit line voltage, the first and second transfer functions both being input-to-output transfer functions of the PSNC circuit, the PSNC circuit configured to produce a ramp voltage signal; and a comparator having an input coupled to the bit line and another input coupled to an output of the PSNC circuit.

The DCG image sensor will be explained in detail below with reference to FIGS. 1 to 10.

Figure 1:
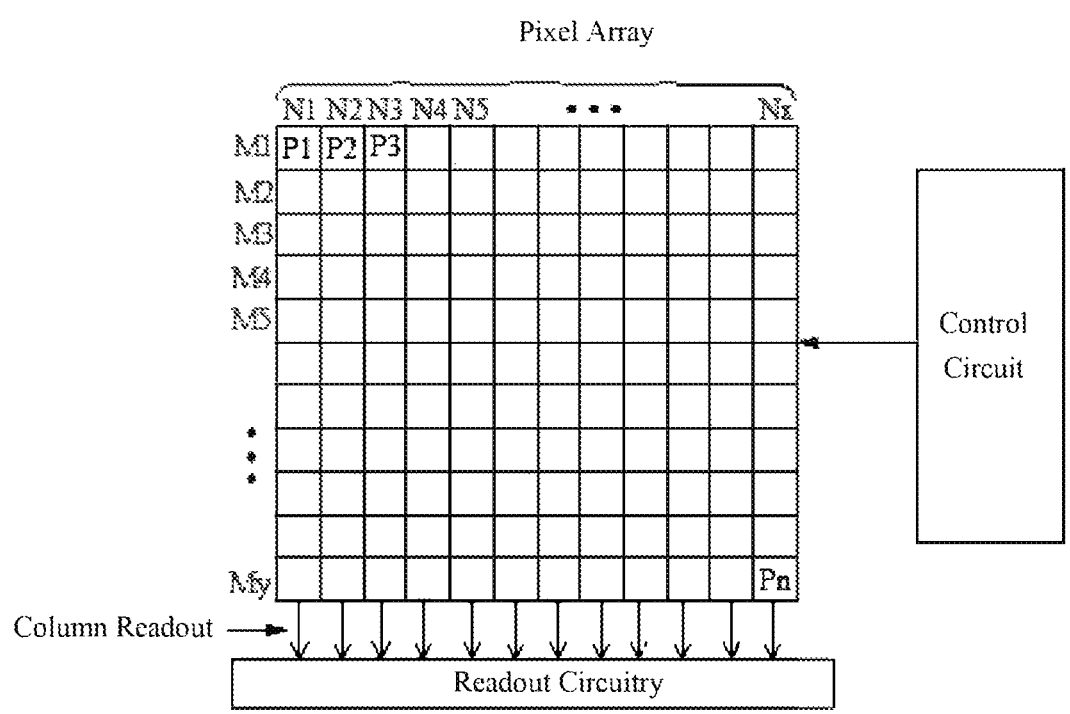
FIG. 1 shows the structure of a system incorporating a dual conversion gain (DCG) image sensor.

FIG. 1 shows an example imaging system in which DCG image sensors according to embodiments of the present invention can be employed.

As shown in FIG. 1, the imaging system may include a pixel array, a control circuitry and a readout circuitry. In one example, the pixel array is a two-dimensional array (e.g., pixel P1, P2, . . . , Pn) in which the pixels are arranged into a number of rows (e.g., M1 to My) and a number of columns (e.g., N1 to Nx) in order to acquire image data of a person, place, object or the like. A two-dimensional image of the person, place, object or the like may be reproduced using the image data at a later time.

Figure 2:
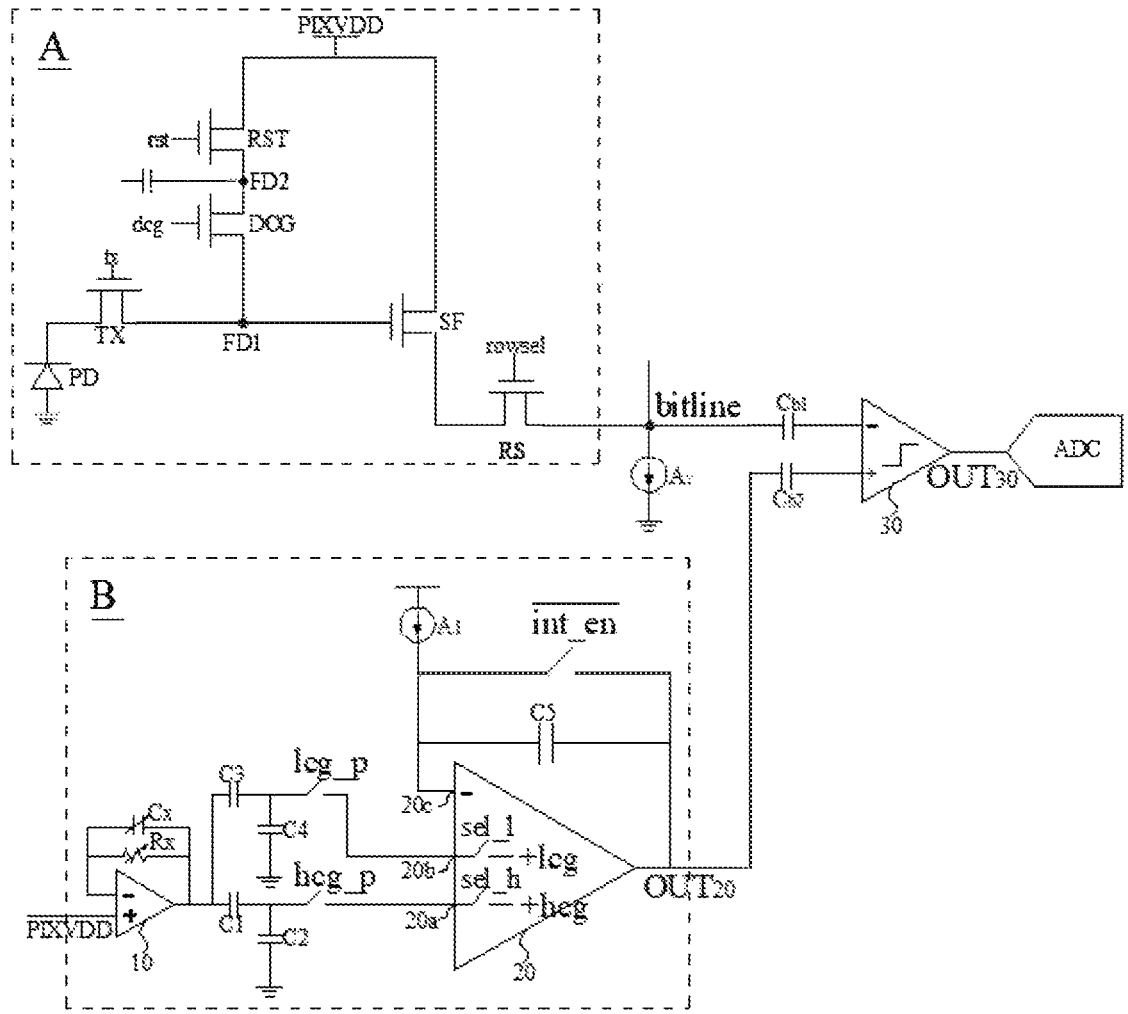
FIG. 2 is a schematic illustration of a DCG image sensor according to an embodiment of the present invention.

FIG. 2 shows a schematic diagram of a DCG image sensor according to an embodiment of the present invention. As shown in FIG. 2, the DCG image sensor includes a pixel circuit A, a power supply noise cancellation (PSNC) circuit B and a comparator 30.

The shown pixel circuit A is an exemplary schematic representation of a pixel Px (any of P1 to Pn) in FIG. 1. The pixel Px may be an example of one pixel in the pixel array and may be configured to perform dual conversion gain (DCG) operations for providing a high dynamic range (HDR). The pixel Px may include a photodiode (PD), a transfer transistor TX, a first floating diffusion (FD1), a dual conversion gain (DCG) transistor, a second floating diffusion (FD2), a reset transistor RST, a source follower SF and a row select transistor RS. It is noted that components referred to above as "transistors" may also be referred to as "gates". Essential operations may include: generating photo-generated carriers from photoelectric conversion, producing analog signals; strobing a row of the pixel array and reading out analog signals from each column in the strobed row; and subsequent processing of the signals including operational gain amplification and analog-to-digital conversion.

The reset transistor RST may be controlled by a reset signal rst provided to a gate of the reset transistor. Other control signals (e.g., a row select signal rowsel, a conversion gain signal dcg and a transfer signal tx) may be likewise provided to respective gates of the row select RS, DCG and transfer TX transistors. The various control signals may be provided by the control circuitry shown in FIG. 1 to control the operation of the DCG pixel to enable its resetting and readout of a signal voltage therefrom, e.g., pixel data or image data output of the DCG pixel.

In some embodiments, image charge photo-generated by the photodiode PD in response to incident light may depend on whether the conversion gain mode is high (HCG) or low (LCG). In the HCG mode, the conversion gain signal dcg drops to a low level, and the DCG transistor is responsively turned off in response to the conversion gain signal dcg. The image charge may be transferred only to the first floating diffusion FD1 and generate on the first floating diffusion FD1 a voltage difference, which can be read out via a bit line (labeled as "bitline"). On the contrary, in the LCG mode, the conversion gain signal dcg is pulled up to a high level, and the DCG transistor is responsively turned on in response to the conversion gain signal dcg. The image charge may be transferred to both the first and second floating diffusions FD1, FD2 and generate another voltage difference on the first floating diffusion FD1 smaller than that in the HCG mode. This voltage difference can also be read out via the bit line ("bit line"). Therefore, the control signal DCG 256 may be varied depending on whether the HCG or LCG mode is desired. Additionally, according to embodiments of the present invention, each DCG pixel in the DCG pixel array may be configured for DCG operations for outputting HCG or LCG pixel data and thus providing HDR image data.

Returning to the example of FIG. 1, after each DCG pixel Px in the DCG pixel array has acquired its pixel data or image charge, the image data is readout by the respective readout circuitry. In the illustrated example, each column of the DCG pixel array is read out through a respective bit line. The bit line is particularly a column bit line.

As shown in FIG. 2, a pixel power supply voltage PIXVDD is applied across a number of transistors (e.g., RST, DCG, SF and RS) and capacitors to the bit line (where it becomes a bitline voltage Vb). Accompanying this, pixel power supply noise may be coupled to the bit line via a parasitic path (e.g., comprising a number of transistors and capacitors) and adversely affect the bit line voltage Vb and hence a voltage on a first sampling capacitor $C_{b1}$ for the comparator 30. Consequently, a change may occur in switch time of the comparator 30, which is unfavorable to quantization performance of a subsequent analog-to-digital converter (ADC).

The pixel power supply noise may be made up of thermal noise of a power supply circuit that sources the pixel power supply voltage PIXVDD and constant fluctuation of the pixel power supply voltage PIXVDD around an expected value due to external factors. The pixel power supply noise may affect signal quantization and image quality in the following ways: the "unclean" power supply may become a source of noise variations within a certain frequency range; depending on the arrangement of the pixels, parasitic capacitance may be produced; the parasitic path may lead to presence of the pixel power supply noise in the bit line; and the pixel power supply noise will be quantized downstream of the comparator 30, which is detrimental to image quality.

Figure 3:
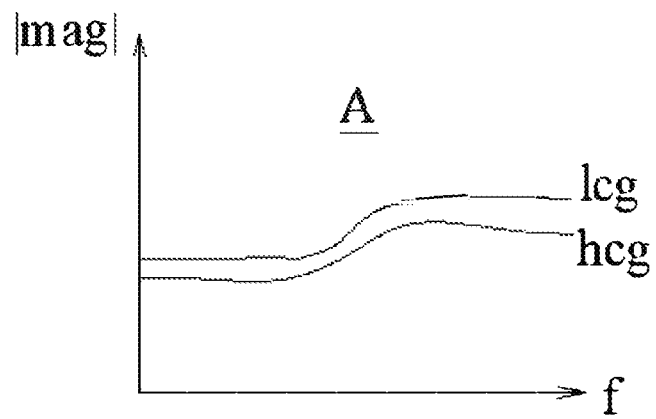
FIG. 3 shows schematic representations of transfer functions from a pixel power supply voltage to a bit line voltage in a pixel circuit A according to an embodiment of the present invention.

FIG. 3 schematically illustrates curves representing transfer functions from the pixel power supply voltage PIXVDD in the pixel circuit A to the bit line voltage Vb, in which the abscissa denotes the frequency and the ordinate represents the absolute magnitude |mag|. A transfer function is a ratio of the Laplace-transform (or Z-transform) of a linear system response (i.e., the output) to the Laplace-transform of an excitation variable (i.e., the input) under zero initial conditions and is usually characterized as a frequency response. For a transfer function, the zero, poles and gain are important.

As noted above, the transistors in the pixel circuit A behave differently in the HCG and LCG modes. For this reason, there are different transfer functions from the pixel power supply voltage PIXVDD to the bit line voltage Vb for the two modes, as shown in FIG. 3, meaning that pixel power supply noise is coupled to the bit line via different parasitic paths (e.g., each comprising a number of transistors and capacitors) in the different modes.

The PSNC circuit B may include a filtering op-amp 10 and an integrating op-amp 20. The integrating op-amp 20 may have two non-inverting inputs (a first non-inverting input 20a and a second non-inverting input 20b), one inverting input 20c and an output $OUT_{20}$. An output of the filtering op-amp 10 may be coupled to the first non-inverting input 20a by an HCG path. In addition, the output of the filtering op-amp 10 may be coupled to the second non-inverting input 20b through an LCG path. The two non-inverting inputs of the integrating op-amp 20 may also be considered as a pair of inputs each corresponding to a respective one of the power supply noise cancellation (PSNC) paths. Only one of the inputs can be selected at a time. That is to say, the non-inverting input of the integrating op-amp 20 corresponding to the LCG path will be selected in the LCG mode, and that corresponding to the HCG path will be selected in the HCG mode. The inverting input 20c of the integrating op-amp 20 is common to both. As used herein, "op-amp" is short for "operational amplifier".

Figure 4:
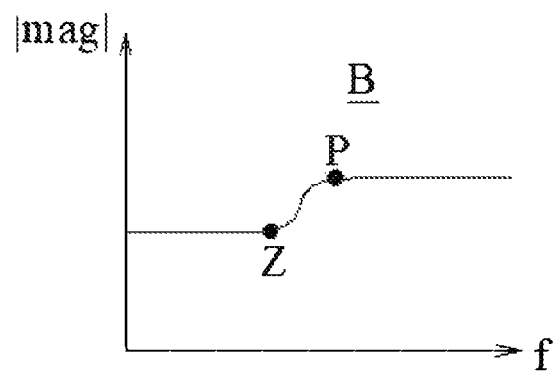
FIG. 4 schematically illustrates a curve representing a transfer function of a power supply noise cancellation circuit B from a pixel power supply voltage to an output voltage of an integrating op-amp 20 according to an embodiment of the present invention.

FIG. 4 shows a curve representing a transfer function from the pixel power supply voltage PIXVDD in the PSNC circuit B to voltage at the output voltage $OUT_{20}$ of the integrating op-amp 20 according to an embodiment of the present invention, which describes a voltage transfer characteristic. The zero Z and pole P in the transfer function mark where the output stays at 0 and approaches infinity, respectively. In the figure, the abscissa denotes the frequency f and the ordinate represents the absolute magnitude |mag|.

The filtering op-amp 10 may include one non-inverting input, one inverting input and an output. The non-inverting input of the filtering op-amp 10 may be coupled to the pixel power supply voltage PIXVDD, and to a variable resistor Rx and a variable capacitor Cx may be connected in parallel between the inverting input and output of the filtering op-amp 10. Changing the resistance of the variable resistor Rx and the capacitance of the variable capacitor Cx will shift the zero and pole in the transfer function from the pixel power supply voltage PIXVDD to the voltage at the output voltage $OUT_{20}$ of the integrating op-amp 20 so that this transfer function of the PSNC circuit B can mimic the transfer function of the pixel circuit A from the pixel power supply voltage PIXVDD to the bit line voltage Vb. The transfer function can also be taken as a conversion equation.

The output of the filtering op-amp 10 may be coupled to the first non-inverting input 20a of the integrating op-amp 20 via the high conversion gain (HCG) path. In particular, the output of the filtering op-amp 10 may be grounded via first and second capacitors C1, C2, with a node between the first and second capacitors C1, C2 being coupled to one end of a high path switch hcg_p. The other end of the high path switch hcg_p may be coupled to the first non-inverting input 20a of the integrating op-amp 20. The high path switch hcg_p is short for a high conversion gain (HCG) path switch. The first and second capacitors C1, C2 may make up a capacitance divider. Changing a ratio of the capacitances of the first and second capacitors C1, C2 through adjusting one or both of them can lead to a change in the gain of the transfer function of the PSNC circuit B from the pixel power supply voltage PIXVDD to the voltage at the output $OUT_{20}$ of the integrating op-amp 20 at a given frequency in the high conversion gain (HCG) mode. In this way, the absolute magnitude |mag| of the transfer function of the PSNC circuit B of FIG. 4 can be tuned to approach the magnitude |mag| of the transfer function of the pixel circuit A of FIG. 3 in the high conversion gain (HCG) mode. Thus, the PSNC circuit B may mimicly assume a transfer function that approximates (i.e., is similar to) the transfer function of the pixel circuit A in the high conversion gain (HCG) operating mode. In particular, with the aid of the HCG path, the PSNC circuit B may mimicly define a second transfer function that approximates the transfer function of the pixel circuit A from the pixel power supply voltage to the bit line voltage in the HCG mode. It can also be taken that the PSNC circuit B can yield a mimicry transfer function that reflects (interfering) effects of the pixel power supply noise in the pixel circuit A in the high conversion gain (HCG) operating mode.

The output of the filtering op-amp 10 may be coupled to the second non-inverting input 20b of the integrating op-amp 20 through the low conversion gain (LCG) path. In particular, the output of the filtering op-amp 10 may be grounded via third and fourth capacitors C3, C4, with a node between the third and fourth capacitors C3, C4 being coupled to one end of a low path switch lcg_p. The other end of the low path switch lcg_p may be coupled to the second non-inverting input 20b of the integrating op-amp 20. The high path switch hcg_p is short for a low conversion gain (LCG) path switch. The third and fourth capacitors C3, C4 may make up a capacitance divider. Changing a ratio of the capacitances of the third and fourth capacitors C3, C4 through adjusting one or both of them can lead to a change in the gain of the transfer function of the PSNC circuit B from the pixel power supply voltage PIXVDD to the voltage at the output $OUT_{20}$ of the integrating op-amp 20 at a given frequency in the low conversion gain (LCG) mode. In this way, the absolute magnitude |mag| of the transfer function of the PSNC circuit B of FIG. 4 can be tuned to approach the magnitude |mag| of the transfer function of the pixel circuit A of FIG. 3 in the low conversion gain (LCG) operating mode. Thus, the PSNC circuit B may mimicly assume a transfer function that approximates (i.e., is similar to) the transfer function of the pixel circuit A in the low conversion gain (LCG) operating mode. In particular, with the aid of the LCG path, the PSNC circuit B may mimicly produce a first transfer function that approximates the transfer function of the pixel circuit A from the pixel power supply voltage to the bit line voltage in the LCG mode. It can also be taken that the PSNC circuit B can mimicly yield a transfer function that reflects (interfering) effects of the pixel power supply noise in the pixel circuit A in the low conversion gain (LCG) operating mode.

Both the first and second transfer functions are input (the pixel power supply voltage PIXVDD)-to-output (the voltage at the output $OUT_{20}$) transfer functions of the PSNC circuit. In addition, the PSNC circuit is configured to produce a ramp voltage signal.

Figure 5:
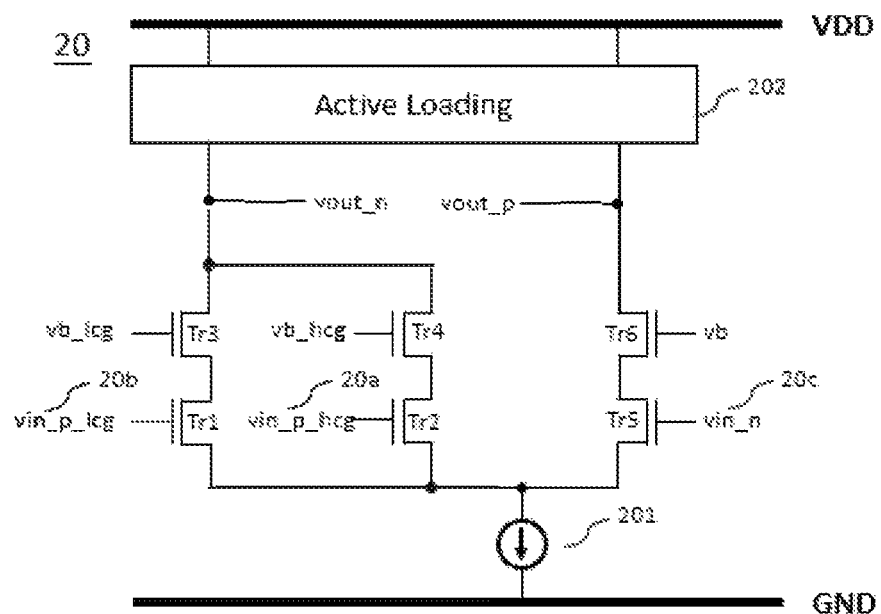
FIG. 5 shows a schematic diagram of an internal circuit of the integrating op-amp 20 of the power supply noise cancellation circuit B according to an embodiment of the present invention.
Figure 6:
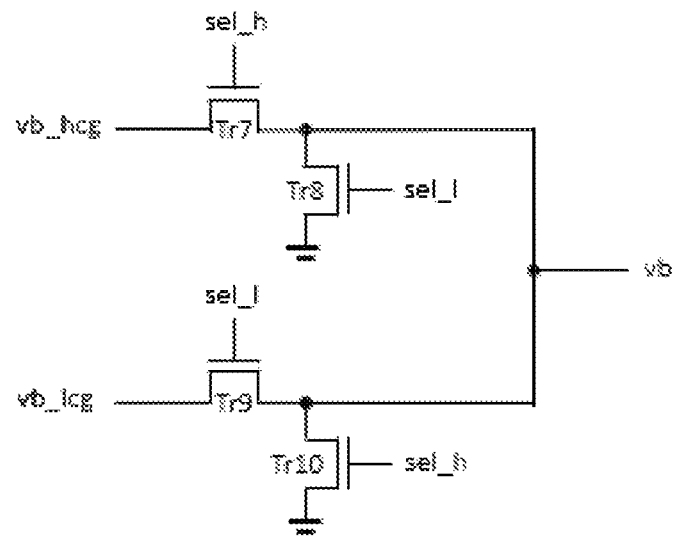
FIG. 6 schematically illustrates how the integrating op-amp 20 in the power supply noise cancellation circuit B operates under the control of low and high gain select switches according to an embodiment of the present invention.
Figure 7:
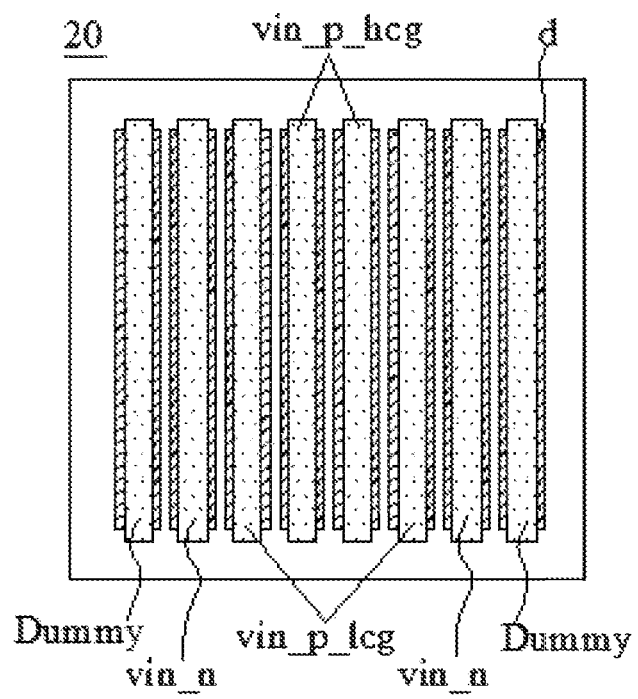
FIG. 7 schematically illustrates the deployment of the integrating op-amp 20 in the power supply noise cancellation circuit B on a chip according to an embodiment of the present invention.

FIG. 5 shows a schematic diagram of an internal circuit of the integrating op-amp 20 of the PSNC circuit B according to this embodiment. FIG. 6 schematically illustrates how the integrating op-amp 20 in the PSNC circuit B according to this embodiment operates under the control of low gain and high gain select switches. FIG. 7 schematically illustrates the deployment of the integrating op-amp 20 in the PSNC circuit B on a chip.

As shown in FIGS. 2,5,6 and 7, the integrating op-amp 20 may include two non-inverting inputs (a first non-inverting input vin_p_hcg20a and a second non-inverting input vin_p_lcg20b), one inverting input vin_n 20c and an output $OUT_{20}$. An integrating capacitor C5 and an integration enable switch (integration enable signal int_en) may be connected in parallel between the inverting input vin_n20c and output $OUT_{20}$ of the integrating op-amp 20. The internal circuit of the integrating op-amp 20 may include a low gain select switch sel_l and a high gain select switch sel_h. The inverting input vin_n 20cs the integrating op-amp 20, one end of the integrating capacitor C5 and one end of the enable switch int_en may be all connected to a current source $A_1$. The second non-inverting input vin_p_lcg20b may be coupled to the low conversion gain (LCG) path, and the first non-inverting input vin_p_hcg20a to the high conversion gain (HCG) path. The inverting input vin_n20c of the operational amplifier may be connected to the current source A1 and one end of the integrating capacitor C5.

The internal circuit of the integrating op-amp 20 may include first to tenth transistors (Tr1 to Tr10). Gate voltages of the first, second and fifth transistors Tr1, Tr2, Tr5 may be voltages at the second non-inverting input vin_p_lcg 20b, first non-inverting input vin_p_hcg 20a and inverting input vin_n 20c, respectively. Voltages at second terminals of the first, second and fifth transistors Tr1, Tr2, Tr5 may be all grounded via a tail current source 201.

In a path of the inverting input vin_n 20c, a first terminal of the fifth transistor Tr5 may be coupled to a second terminal of the sixth transistor Tr6, with a gate and a first terminal of the sixth transistor Tr6 being provided with a bias voltage vb and a voltage vout_p, respectively.

In a path of the first non-inverting input vin_p_hcg 20a, a first terminal of the second transistor Tr2 may be coupled to a second terminal of the fourth transistor Tr4, with a gate and a first terminal of the fourth transistor Tr4 being provided with a HCG bias voltage vb_hcg and a voltage vout_n, respectively.

In a path of the second non-inverting input vin_p_lcg 20b, a first terminal of the first transistor Tr1 may be coupled to a second terminal of the third transistor Tr3, with a gate and a first terminal of the third transistor Tr3 being provided with a LCG bias voltage vb_lcg and the voltage vout_n, respectively. The first terminals of the third and fourth transistors Tr3, Tr4 may be coupled to a single (common) node.

With vb denoting the bias voltage for the transistor in the inverting input path, vout_n and vout_p are differential outputs coupled to the integrating op-amp 20, and 202 is an input terminal of the active load integrating op-amp 20 (e.g., a current mirror).

FIG. 6 shows a circuit for selecting the bias voltages vb for the transistors in the LCG and HCG inputs.

The gate of the fourth transistor Tr4 (vb_hcg) may be coupled to a first terminal of the seventh transistor Tr7. A gate voltage of the seventh transistor Tr7 can serve as a control signal for the high gain select switch sel_h. A second terminal of the seventh transistor Tr7 may be coupled to a first terminal of the eighth transistor Tr8. A gate voltage of the eighth transistor Tr8 can serve as a control signal for the low gain select switch sel_l. A node between the second terminal of the seventh transistor Tr7 and the first terminal of the eighth transistor Tr8 (the bias voltage vb is applied to this node) may be coupled to the gate of the sixth transistor Tr6. For the HCG input, "hcg" in the label "vb_hcg" of the gate voltage of the fourth transistor Tr4 and "h" in the label "sel_h" of the high gain select switch both stand for high conversion gain (HCG). The following conditions may be satisfied: if sel_h=1 (sel_l=0), vb_hcg=vb; and if sel_h=0 (sel_l=1), vb_hcg=0. In other words, when the high gain select switch is closed and the low gain select switch is open, the HCG bias voltage is equal to the aforementioned bias voltage. When the high gain select switch is open and the low gain select switch is closed, the HCG bias voltage is equal to zero.

The gate of the third transistor Tr3 (vb_lcg) may be coupled to a first terminal of the ninth transistor Tr9. A gate voltage of the ninth transistor Tr9 can serve as a control signal for the low gain select switch sell. A second terminal of the ninth transistor Tr9 may be coupled to a first terminal of the tenth transistor Tr10. A gate voltage of the tenth transistor Tr10 can serve as a control signal for the high gain select switch sel_h. A node between the second terminal of the ninth transistor Tr9 and the first terminal of the tenth transistor Tr10 (the bias voltage vb is applied to this node) may be coupled to the gate of the sixth transistor Tr6. "lcg" in the label "vb_lcg" of the gate voltage of the third transistor Tr3 and "l" in the label "sel_l" of the low gain select switch both stand for low conversion gain (LCG). The following conditions may be satisfied: if sel_l=1 (sel_h=0), vb_lcg=vb; and if sel_l=0 (sel_h=1), vb_lcg=0. In other words, when the lowgain select switch is closed and the high gain select switch is open, the LCG bias voltage is equal to the aforementioned bias voltage. When the low gain select switch is open and the high gain select switch is closed, the LCG bias voltage is equal to zero.

As used herein, the first and second terminals of the transistors may be, for example, their drains and sources, respectively. Alternatively, it is also possible that the first and second terminals may be, for example, the transistors' sources and drains, respectively, depending on whether the transistors are P- or N-type transistors.

FIG. 7 shows an example of how the integrating op-amp 20 in the PSNC circuit B according to this embodiment is deployed on a chip. As shown in FIGS. 5 to 7, the inverting input vin_n20c (e.g., the gate of the fifth transistor Tr5), the second non-inverting input vin_p_lcg 20b (e.g., the gate of the first transistor Tr1) and the first non-inverting input vin_p_hcg 20a (e.g., the gate of the second transistor Tr2) may be arranged side by side in a parallel configuration.

Alternatively, if required, they may be arranged in a mirrored configuration or even provided with dummy regions ("Dummy") beside them. The inverting input vin_n20c, second non-inverting input vin_p_lcg 20b and first non-inverting input vin_p_hcg 20a may be made of polysilicon. Specifically, the gates of the transistors may be fabricated from polysilicon, with doped regions d being provided on both sides of each of these polysilicon gates.

According to an embodiment of the present invention, the DCG image sensor comprises a comparator 30. A signal from the output $OUT_{20}$ of the integrating op-amp 20 may be coupled to a non-inverting input of the comparator 30 in the DCG image sensor via a second sampling capacitor $C_{b2}$. A signal from the bit line ("bit line") may be coupled to an inverting input of the comparator 30 via the first sampling capacitor $C_{b1}$. An output of the comparator 30 may be coupled to the analog-to-digital converter (ADC). The signal from the output $OUT_{20}$ of the integrating op-amp 20 may be a ramp voltage signal produced by the integrating op-amp 20 combined with a noise signal coupled from the pixel power supply voltage terminal PIXVDD to the output $OUT_{20}$ of the integrating op-amp 20. The signal from the bit line ("bit line") may be the bit line voltage Vb combined with a noise signal coupled from the pixel power supply voltage terminal PIXVDD to the bit line ("bit line").

Figure 8:
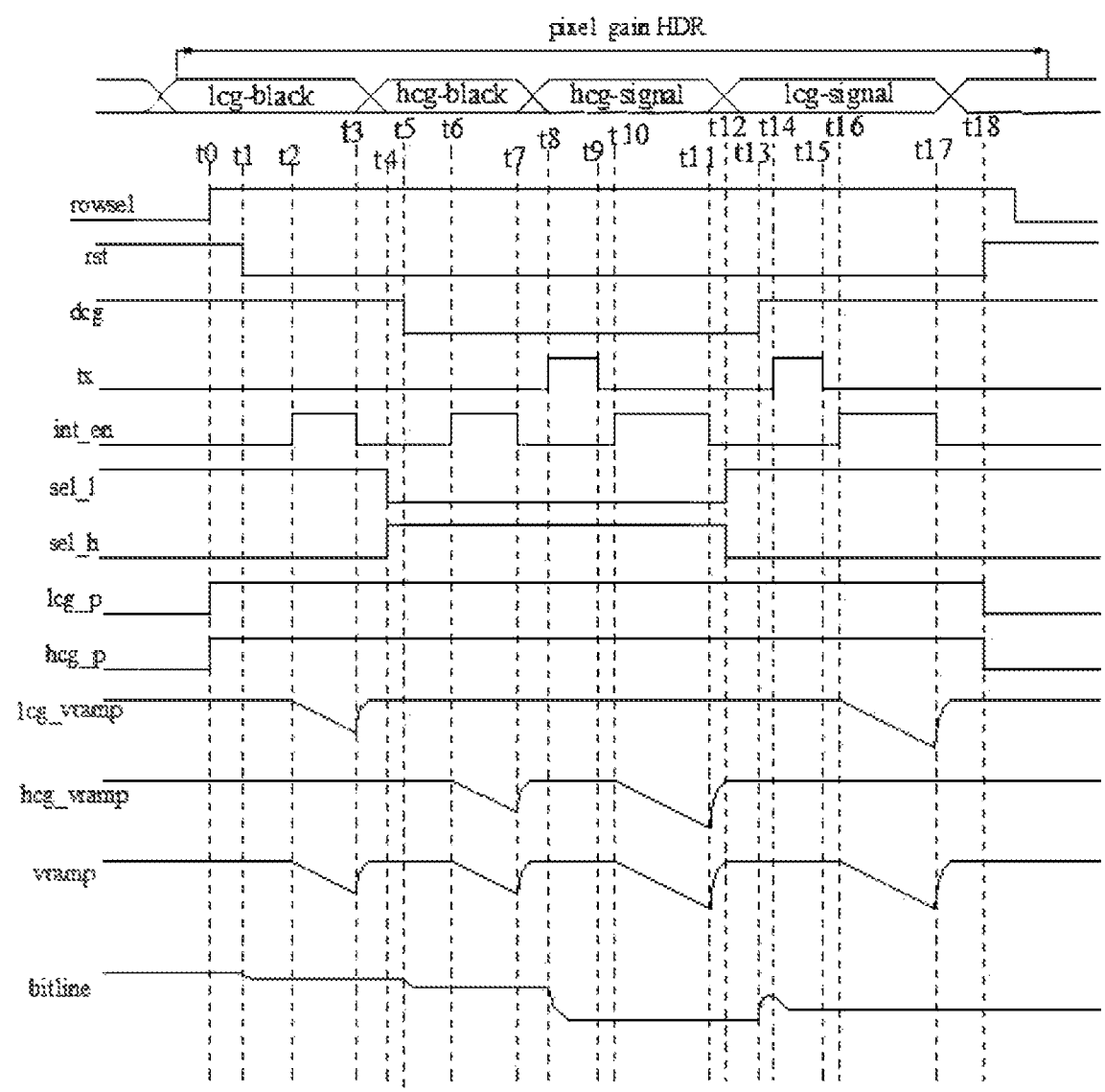
FIG. 8 is a circuit timing diagram of a DCG image sensor according to an embodiment of the present invention.

FIG. 8 shows a circuit timing diagram of the DCG image sensor according to an embodiment of the present invention. This simplified timing diagram is presented to exemplify how an HDR image can be acquired from LCG and HCG pixel data captured by the DCG pixels according to an embodiment of the present invention. Correlated double sampling of each DCG pixel is realized with LCG and HCG sample-and-hold operations on a reset voltage ("lcg-black" and "hcg-black") on the first floating diffusion FD1 as well as LCG and HCG sample-and-hold operations on a signal voltage ("lcg-signal" and "hcg-signal") on the first floating diffusion FD1. A particular process will be described below in context of the pixel circuit shown in FIG. 2.

In a first phase, an LCG reset (e.g., black) value is sampled and held ("lcg-black"). In a second phase, an LCG reset (e.g., black) value is sampled and held ("lcg-black"). In a third phase, an HCG signal value is sampled and held ("hcg-signal"). In a fourth phase, an LCG signal value is sampled and held ("lcg-signal"). An LCG output value of the correlated double sampling of the DCG pixel, which is equal to the difference between the reset ("lcg black") and signal ("lcg signal") values sampled at LCG may be used under bright-light conditions. Likewise, an HCG output value of the correlated double sampling of the DCG pixel, which is equal to the difference between the reset ("hcg black") and signal ("hcg signal") values sampled at HCG may be used under low-light conditions.

At t0, the row select signal rowsel in the pixel circuit A rises high, turning the row select transistor RS on. In the time period from t0 to t18, the row select signal rowsel stays high, and the row select transistor RS is thus kept on. As a result, pixels in the selected row are operated. Moreover, voltages at the high path switch hcg_p and low path switch lcg_p in the PSNC circuit B are both pulled high at t0, closing both the switches. During t0-t18, the voltages stay high and the switches are therefore kept on and prepared.

The reset signal rst in the pixel circuit A drops low at t1 and stay at the level until t18. In this period, the reset transistor RST is turned off, allowing image signal acquisition.

The conversion gain signal dcg in the pixel circuit A is high during t0-t5, turning the DCG transistor on and thus causing the image sensor to operate in the LCG mode. Additionally, the conversion gain signal dcg is low during t5-t13, turning off the DCG transistor and causing the image sensor to operate in the HCG mode. During t13-t18, the signal dcg is again high, and the DCG transistor is thus turned on to cause operation of the image sensor in the LCG mode.

At t2, the integration enable signal int_en in the PSNC circuit B rises high, and a NOT operation is then performed on the integration enable signal int_en to result in a low level, which opens the corresponding switch and thus triggers the integrating capacitor C5. The integration enable signal int_en stays high until t3, and the image sensor operates in the LCG mode during the period from t2 to t3. At the same time, under the action of the integrating capacitor C5, the integrating op-amp 20 produces an integrated ramp voltage signal lcg_vramp, which is output from the terminal $OUT_{20}$ of the integrating op-amp 20 and coupled by the second sampling capacitor $C_{b2}$ to the non-inverting input of the comparator 30. If the non-inverting input of the comparator 30 overlaps with the inverting input of the comparator 30, the bit line voltage is coupled by the first sampling capacitor $C_{b1}$ to the inverting input of the comparator 30, and the comparator 30 outputs "0", and a low conversion gain (LCG) reset signal is thus acquired. Quantization of the LCG reset (e.g., black) value ("lcg-black") is ended at t3, and the ramp voltage signal lcg_vramp is responsively switched back to a reference state.

At t4, the low gain select switch sel1 in the PSNC circuit B is open, and the high gain select switch sel_h is closed.

The conversion gain signal dcg in the pixel circuit A is pulled low at t5 and stays at the level till t13. As a result, the DCG transistor is turned off, and the image sensor operates in the HCG mode.

At t6, the integration enable signal int_en in the PSNC circuit B rises high, and a NOT operation is then performed on the integration enable signal int_en to result in a low level, which opens the corresponding switch of the integration enable signal int_en and thus triggers the integrating capacitor C5. The signal int_en stays high until t7, and the image sensor operates in the HCG mode during t6-t7. In the same period, under the action of the integrating capacitor C5, the integrating op-amp 20 produces an integrated ramp voltage signal hcg_vramp, which is output from the terminal $OUT_{20}$ of the integrating op-amp 20 and coupled by the second sampling capacitor $C_{b2}$ to the non-inverting input of the comparator 30. The bit line voltage coupled by the first sampling capacitor $C_{b1}$ to the inverting input of the comparator 30 and the non-inverting input of the comparator 30 overlaps with the inverting input of the comparator 30, the comparator 30 outputs"0", and a high conversion gain (HCG) reset signal is thus obtained. Quantization of the HCG reset (e.g., black) value ("hcg-black") is ended at t7, and the ramp voltage signal hcg_vramp is responsively switched back to a reference state.

During t8-t9, the transfer signal tx is high, turning on the transfer transistor TX and allowing image signal transfer. The pixel output, namely the bit line voltage Vb, is coupled to the inverting input of the comparator 30 by the first sampling capacitor $C_{b1}$.

During t10-t11, the integration enable signal int_en is high, and the image sensor operates in the HCG mode, concurrently with the integrating op-amp 20 producing an integrate dramp voltage signal hcg_vramp under the action of the integrating capacitor C5, which is coupled by the second sampling capacitor Cb2 to the non-inverting input of the comparator 30. The bit line voltage coupled by the first sampling capacitor $C_{b1}$ to the inverting input of the comparator 30 and the non-inverting input of the comparator 30 overlaps with the inverting input of the comparator 30, the comparator 30 outputs "0", and an HCG image signal is thus obtained. Quantization of the HCG image signal is ended at t11, and the ramp voltage signal hcg_vramp is responsively switched back to a reference state.

At t12, the high gain select switch sel_h is open, and the low gain select switch sel_l is closed.

At t13, the conversion gain signal dcg is pulled high, turning the DCG transistor on and switching the pixel array circuit to the LCG mode. As a result, the image charge can be transferred to both the first and second floating diffusions FD1, FD2. The conversion gain signal dcg stays high in the period from t13 to t18. Thus, in this period, the DCG transistor is on and the image sensor operates in the LCG mode.

During t14-t15, the transfer signal tx is high, turning on the transfer transistor TX and allowing image signal transfer. The pixel output, namely the bit line voltage Vb, is coupled to the inverting input of the comparator 30 by the first sampling capacitor $C_{b1}$.

During t16-t17, the integration enable signal int_en is high, and the image sensor operates in the LCG mode, concurrently with the integrating op-amp 20 producing an integrated ramp voltage signal lcg_vramp under the action of the integrating capacitor C5, which is coupled by the second sampling capacitor $C_{b2}$ to the non-inverting input of the comparator 30. The bit line voltage coupled by the first sampling capacitor $C_{b1}$ to the inverting input of the comparator 30 and the non-inverting input of the comparator 30 overlaps with the inverting input of the comparator 30, the comparator 30 outputs "0", and an LCG image signal is thus obtained. Quantization of the LCG image signal is ended at t17, and the ramp voltage signal hcg_vramp is responsively switched back to a reference state.

At t18, the reset signal rst is pulled high, and the voltages at the high and low path switches shcg_phcg_p and lcg_plcg_p are both pulled low. At this point, the whole process ends.

Quantization cycles performed in the pixel circuit result in digitalized LCG and HCG image signals.

In each quantization cycle as described in the above process, the LCG reset, HCG reset, HCG image and LCG image signals are sequentially read out via the pixel output of the pixel array for quantization by the readout circuitry. In this way, a high dynamic range output of the image sensor is achieved.

In the pixel circuit A, the conversion gain signal dcg is high during t0-t5. Accordingly, the DCG transistor is turned on, and the image sensor operates in the LCG mode. During t5-t13, the conversion gain signal dcg is low, turning off the DCG transistor and causing the image sensor to operate in the HCG mode. Further, the conversion gain signal dcg is again high during t13-t18, turning the DCG transistor on and causing the image sensor to operate in the LCG mode.

In the PSNC circuit B, the high gain select switch sel_h is open (low) during t0t4, closed (high) during t4-t12 and again open (low) during t12-t18.

In the PSNC circuit B, the low gain select switch sel_l is closed (high) during t0t4, open (low) during t4-t12 and again closed (high) during t12-t18.

Ramp voltage signals vramp output from the terminal $OUT_{20}$ of the integrating op-amp 20 include the HCG-mode ramp voltage signal hcg_vramp and LCG-mode ramp voltage signal lcg_vramp.

In a first time interval (e.g., t2-t3) during the reading of the LCG reset signal ("lcg-black"), the integration enable signal int_en is high and a NOT operation is performed on the high level to result in a low level, which opens the integration enable switch and triggers the integrating capacitor C5. As a result, the integrating op-amp carries out an integration operation and outputs a ramp voltage signal vramp. Under the control of the conversion gain signal dcg, the pixel circuit A in the image sensor operates in the LCG mode, and the low gain select switch sel_l in the PSNC circuit B is closed. Thus, the output of the filtering op-amp 10 is fed to the second non-inverting input 20b of the integrating op-amp 20 via the low conversion gain (LCG) path. Likewise, in a fourth time interval (e.g., t16-t17) during the reading of the LCG image signal ("lcg-signal"), the integration enable signal int_en is high and the integration enable switch is open, allowing the integrating op-amp to perform an integration operation. Under the control of the conversion gain signal dcg, the pixel circuit A in the image sensor operates in the LCG mode, and the low gain select switch sel_l in the PSNC circuit B is closed. Thus, the output of the filtering op-amp 10 is fed to the second non-inverting input 20b of the integrating op-amp 20 via the LCG path. Following the zero, pole and gain adjustment principles for a transfer function as discussed above, the PSNC circuit mimics a variation of the pixel power supply voltage of the pixel circuit in the LCG mode. It will be appreciated that the mimicry transfer function of the PSNC circuit B that approximates (i.e., is similar to) the LCG-mode transfer function of the pixel circuit A, that is, pixel power supply noise mimic by the PSNC circuit B approximates (i.e., is similar to) that of the pixel circuit A in the LCG operating mode. Therefore, in this operating mode, the noise signal of the pixel circuit A coupled from the pixel power supply voltage terminal PIXVDD to the bit line and the noise signal of the PSNC circuit B coupled from the pixel power supply voltage terminal PIXVDD to the output $OUT_{20}$ of the integrating op-amp 20 can cancel out each other at the two inputs of the comparator 30.

In a second time interval (e.g., t6-t7) during the reading of the HCG reset signal ("hcg-black"), the integration enable signal int_en is high and the integration enable switch is open, allowing the integrating op-amp to perform an integration operation. In addition, the conversion gain signal dcg is low and controls the pixel circuit A in the image sensor to operate in the HCG mode. The high gain select switch sel_h in the PSNC circuit B is closed, and the output of the filtering op-amp 10 is fed to the first non-inverting input 20a of the integrating op-amp 20 via the HCG path. Similarly, in a third time interval (e.g., t10t11) during the reading of the HCG image signal ("hcg-signal"), the integration enable signal int_en is high and the integration enable switch is open, allowing the integrating op-amp to perform an integration operation. In addition, the conversion gain signal dcg is low and controls the pixel circuit A in the image sensor to operate in the HCG mode. The high gain select switch sel_h in the PSNC circuit B is closed, and the output of filtering op-amp 10 is fed to the first non-inverting input 20a of the integrating op-amp 20 via the HCG path. Following the zero, pole and gain adjustment principles for a transfer function as discussed above, the PSNC circuit mimics a variation of a pixel power supply voltage of the pixel circuit in the HCG mode. It will be appreciated that the mimicry transfer function of the PSNC circuit B that approximates (i.e., is similar to) the HCG-mode transfer function of the pixel circuit A, that is, pixel power supply noise mimic by the PSNC circuit B approximates (i.e., is similar to) that of the pixel circuit A in the HCG operating mode. Thus, in this operating mode, the noise signal of the pixel circuit A coupled from the pixel power supply voltage terminal PIXVDD to the bit line and the noise signal of the PSNC circuit B coupled from the pixel power supply voltage terminal PIXVDD to the output $OUT_{20}$ of the integrating op-amp 20 can cancel out each other at the two inputs of the comparator 30.

According to embodiments of the present invention, the DCG image sensor is a dual input pair active power supply noise cancellation (PSNC) architecture. Therefore, the present invention adds an active PSNC option to the market of DCG image sensor products.

In order to overcome the problem of power supply noise, the inventors ever attempted to design only one operating path in the PSNC circuit, which were to be shared by the LCG and HCG modes. In this design, LCG and HCG signals were to be transmitted through the path successively. However, it was found that the transfer function of the pixel power supply voltage PIXVDD to the bit line voltage varied between the LCG and HCG modes, and a PSNC circuit with a single operating path could not address this due to possible cross-talk or interference between noise cancellation mechanisms in the two modes. Indeed, the PSNC circuit with one operating path exhibited only suboptimal noise cancellation performance for the pixel power supply voltage PIXVDD, or even led to reduced image quality.

According to the present invention, the low (LCG) and high (HCG) conversion gain paths are two independent PSNC paths resulting in different transfer functions in the LCG and HCG operating modes, which closely "track" variation of the pixel power supply voltage PIXVDD and thus allows noise cancellation without cross-talk between the two modes. Therefore, with the present invention, the advance impact of power supply noise can be mitigated, resulting in improved image quality.

Figure 9:
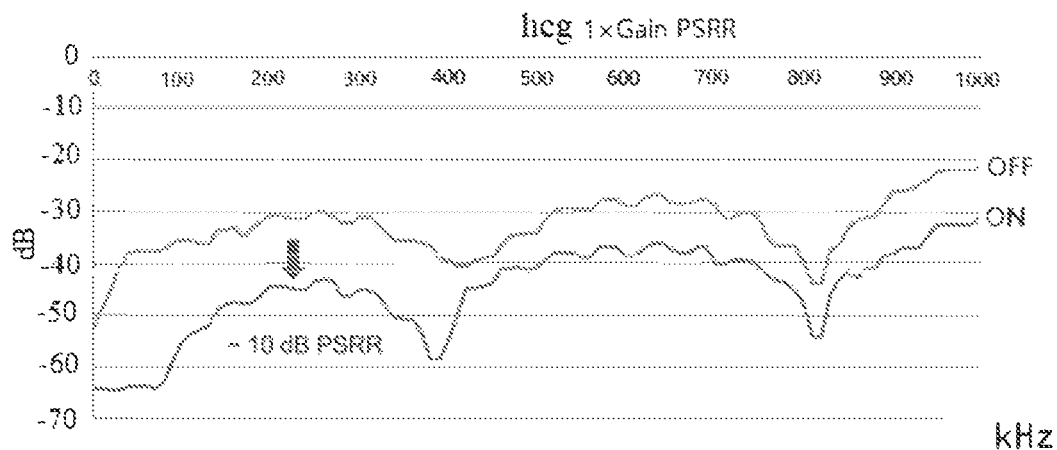
FIG. 9 schematically illustrates a comparison that demonstrates an improvement in power supply rejection ratio (PSRR) achieved by a DCG image sensor in a high conversion gain operating mode according to an embodiment of the present invention.

FIG. 9 schematically illustrates a comparison that demonstrates a power supply rejection ratio (PSRR) improvement achieved by the DCG image sensor in the HCG operating mode according to an embodiment of the present invention.

A PSRR of a circuit describes the circuit's ability to suppress any external signal (noise or variation) present in the input power supply and prevent the interfering signal from impairing the output quality. The PSRR is defined as the ratio of a change in the input power supply (in volts) to a responsive change in the output signal (in volts) and is often expressed in decibels. In FIG. 9 with the image sensor operating in the HCG mode, the curve "ON" represents a PSRR profile of the DCG image sensor incorporating the PSNC circuit B according to this embodiment, and the curve "OFF" represents a PSRR profile of an image sensor that does not have the PSNC circuit B. As can be seen from FIG. 9, in the HCG mode, the two curves are similar in shape, but "ON" is overall downward offset from the "OFF". This demonstrates that the DCG image sensor according to this embodiment better suppresses noise in the pixel power supply voltage PIXVDD (i.e., exhibits better noise cancellation performance) within the concerned frequency range, which is helpful in improving image quality.

Figure 10:
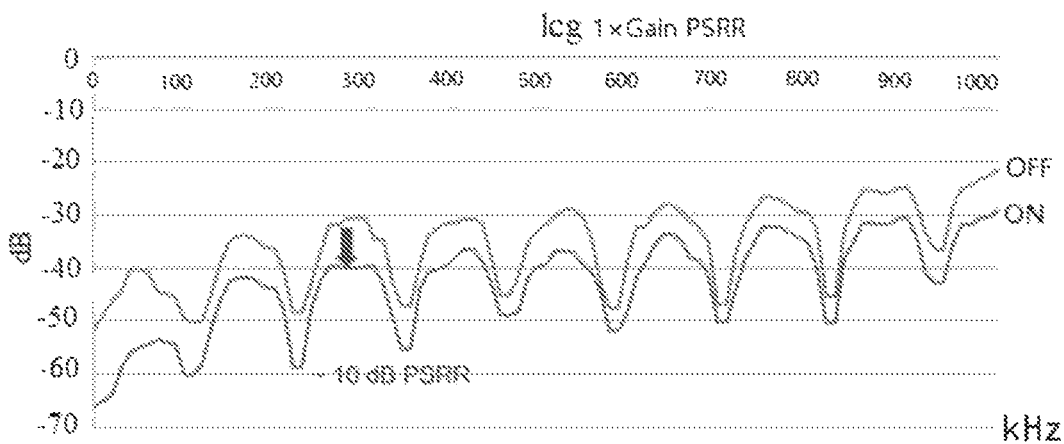
FIG. 10 schematically illustrates a comparison that demonstrates an improvement in power supply rejection ratio (PSRR) achieved by a DCG image sensor in a low conversion gain operating mode according to an embodiment of the present invention.

FIG. 10 schematically illustrates a comparison that demonstrates a PSRR improvement achieved by the DCG image sensor in the LCG operating mode according to an embodiment of the present invention. As can be seen from FIG. 10, the DCG image sensor according to this embodiment better suppresses noise in the pixel power supply voltage PIXVDD (i.e., exhibits better noise cancellation performance) within the concerned frequency range, which is helpful in improving image quality.

In summary, the present invention provides a DCG image sensor comprising: a pixel circuit, through which pixel power supply voltage noise is transferred to a bit line; a PSNC circuit with an input to which the pixel power supply voltage is applied, the PSNC circuit mimicly producing a first transfer function with the aid of an LCG path, the PSNC circuit mimicly producing a second transfer function with the aid of an HCG path; and a comparator. According to the present invention, LCG and HCG paths are two independent PSNC paths that result in different transfer functions capable of tracking the variation of the pixel power supply voltage in low and high conversion gain modes. This allows mitigating the effects of power supply noise in those modes. Additionally, there is no cross-talk between noise cancellation processes in the low and high conversion gain modes. Decoupling noise cancellation mechanism for the low and high conversion gain modes reduces adverse impact of power supply noise and improves image quality. The proposed DCG image sensor has the advantages of low noise and a high PSRR that can well suppress noise interference in the HCG and LCG modes and thus ensures low noise of the image sensor.

It is noted that the embodiments disclosed herein are described in a progressive manner, with the description of each embodiment focusing on its differences from others. Reference can be made between the embodiments for their identical or similar parts. Since the method embodiments correspond to the device embodiments, they are described relatively briefly, and reference can be made to the device embodiments for details in them.

The description presented above is merely that of some preferred embodiments of the present invention and does not limit the scope thereof in any sense. Any and all changes and modifications made by those of ordinary skill in the art based on the above teachings fall within the scope as defined in the appended claims.

What is claimed is:

1. A dual conversion gain image sensor, comprising:
a pixel circuit through which a noise of a pixel power supply voltage is transferred to a bit line, wherein the pixel circuit comprises a low conversion gain mode and a high conversion gain mode;
a power supply noise cancellation circuit having an input to which the pixel power supply voltage is applied,
the power supply noise cancellation circuit mimicly producing, with an aid of a low conversion gain path, a first transfer function that approximates a low conversion gain mode transfer function of the pixel circuit from the pixel power supply voltage to a bit line voltage,
the power supply noise cancellation circuit mimicly producing, with an aid of a high conversion gain path, a second transfer function that approximates a high conversion gain mode transfer function of the pixel circuit from the pixel power supply voltage to the bit line voltage,
each of the first and second transfer functions being input-to-output transfer functions of the power supply noise cancellation circuit, wherein the power supply noise cancellation circuit is configured to produce a ramp voltage signal; and
a comparator having a first input coupled to the bit line and a second input coupled to an output of the power supply noise cancellation circuit.

2. The dual conversion gain image sensor of claim 1, wherein the power supply noise cancellation circuit comprises a filtering operational amplifier and an integrating operational amplifier,
  wherein the integrating operational amplifier comprises a first non-inverting input, a second non-inverting input and an inverting input and an output, wherein the first non-inverting input is coupled to an output of the filtering operational amplifier via the high conversion gain path, and wherein the second non-inverting input is coupled to the output of the filtering operational amplifier via the low conversion gain path.

3. The dual conversion gain image sensor of claim 2, wherein the pixel power supply voltage is provided to a non-inverting input of the filtering operational amplifier, and wherein a variable resistor and a variable capacitor are coupled in parallel between an inverting input and the output of the filtering operational amplifier.

4. The dual conversion gain image sensor of claim 3, wherein an integrating capacitor and an integration enable switch are coupled in parallel between the inverting input and the output of the integrating operational amplifier, and wherein an internal circuit of the integrating operational amplifier comprises a low gain select switch and a high gain select switch.

5. The dual conversion gain image sensor of claim 4, wherein the output of the filtering operational amplifier is grounded via a first capacitor and a second capacitor, wherein a node between the first and second capacitors is coupled to a first end of the high path switch, and a second end of the high path switch is coupled to the first non-inverting input.

6. The dual conversion gain image sensor of claim 4, wherein the output of the filtering operational amplifier is grounded via a third capacitor and a fourth capacitor, wherein a node between the third and fourth capacitors is coupled to a first end of the low path switch, and a second end of the low path switch is coupled to the second non-inverting input.

7. The dual conversion gain image sensor of claim 2, wherein an internal circuit of the integrating operational amplifier further comprises first to sixth transistors,
  wherein in a path of the inverting input, a first terminal of the fifth transistor is coupled to a second terminal of the sixth transistor, and a bias voltage is applied to a gate of the sixth transistor,
  wherein in a path of the first non-inverting input, a first terminal of the second transistor is coupled to a second terminal of the fourth transistor, and wherein a high conversion gain bias voltage is applied to a gate of the fourth transistor, and
  wherein in a path of the second non-inverting input, a first terminal of the first transistor is coupled to a second terminal of the third transistor, wherein a low conversion gain bias voltage is applied to a gate of the third transistor, and wherein a first terminal of the third transistor and a first terminal of the fourth transistor are coupled to a common node.

8. The dual conversion gain image sensor of claim 7, wherein a voltage present at the second non-inverting input is provided to a gate of the first transistor, wherein a voltage present at the first non-inverting input is provided to a gate of the second transistor, wherein a voltage present at the inverting input is provided to a gate of the fifth transistor, and wherein a second terminal of each of the first, second and the fifth transistors is grounded via a tail current source.

9. The dual conversion gain image sensor of claim 7, wherein the internal circuit of the integrating operational amplifier further comprises a seventh transistor and an eighth transistor,
  wherein: the seventh transistor has a first terminal coupled to the gate of the fourth transistor; the seventh transistor has a gate applied with a voltage serving as a control signal for the high gain select switch; the seventh transistor has a second terminal coupled to a first terminal of the eighth transistor; the eighth transistor has a second terminal grounded; and the eighth transistor has a gate applied with a voltage serving as a control signal for the low gain select switch, wherein a node between the second terminal of the seventh transistor and the first terminal of the eighth transistor is coupled to the gate of the sixth transistor, wherein the high conversion gain bias voltage is equal to the bias voltage when the high gain select switch is closed while the low gain select switch is open, and wherein the high conversion gain bias voltage is equal to zero when the high gain select switch is open while the low gain select switch is closed.

10. The dual conversion gain image sensor of claim 7, wherein the internal circuit of the integrating operational amplifier further comprises a ninth transistor and a tenth transistor,
  wherein: the ninth transistor has a first terminal coupled to the gate of the third transistor; the ninth transistor has a gate applied with a voltage serving as a control signal for the low gain select switch; the ninth transistor has a second terminal coupled to a first terminal of the tenth transistor; the tenth transistor has a second terminal grounded; and the tenth transistor has a gate applied with a voltage serving as a control signal for the high gain select switch, wherein a node between the second terminal of the ninth transistor and the first terminal of the tenth transistor is coupled to the gate of the sixth transistor, wherein the low conversion gain bias voltage is equal to the bias voltage when the low gain select switch is closed while the high gain select switch is open, and wherein the low conversion gain bias voltage is equal to zero when the low gain select switch is open while the high gain select switch is closed.

11. The dual conversion gain image sensor of claim 4, wherein the pixel circuit comprises a dual conversion gain transistor having a gate controlled by a conversion gain signal, and wherein the pixel circuit is configured to sequentially read a low conversion gain reset signal, a high conversion gain reset signal, a high conversion gain image signal and a low conversion gain image signal.

12. The dual conversion gain image sensor of claim 11,
  wherein in a first time interval during the reading of the low conversion gain reset signal: the integration enable switch is open to allow the integrating operational amplifier to perform an integration operation; and the conversion gain signal is high to cause the pixel circuit to operate in the low conversion gain mode with the low gain select switch being closed, and
  wherein in a fourth time interval during the reading of the low conversion gain image signal: the integration enable switch is open to allow the integrating operational amplifier to perform an integration operation; and the conversion gain signal is high to cause the pixel circuit to operate in the low conversion gain mode with the low gain select switch being closed, and wherein the power supply noise cancellation circuit mimics a variation of the pixel power supply voltage of the pixel circuit in the low conversion gain mode.

13. The dual conversion gain image sensor of claim 11, wherein in a second time interval during the reading of the high conversion gain reset signal: the integration enable switch is open to allow the integrating operational amplifier to perform an integration operation; and the conversion gain signal is low to cause the pixel circuit to operate in the high conversion gain mode with the high gain select switch being closed, and wherein in a third time interval during the reading of the high conversion gain image signal: the integration enable switch is open to allow the integrating operational amplifier to perform an integration operation; and the conversion gain signal is low to cause the pixel circuit to operate in the high conversion gain mode with the high gain select switch being closed, and wherein the power supply noise cancellation circuit mimics a variation of the pixel power supply voltage of the pixel circuit in the high conversion gain mode.

14. The dual conversion gain image sensor of claim 1, wherein: the bit line is coupled to an inverting input of the comparator by a first sampling capacitor; and the output of the power supply noise cancellation circuit is coupled to a non-inverting input of the comparator by a second sampling capacitor.

* * * * *